United States Patent
Timonen et al.

(10) Patent No.: US 6,741,848 B2
(45) Date of Patent: May 25, 2004

(54) METHOD AND SYSTEM OF OFFERING WIRELESS TELECOMMUNICATION SERVICES IN A VISITED TELECOMMUNICATION NETWORK

(75) Inventors: Juha T. Timonen, Oulu (FI); Jouni Smolander, Tampere (FI)

(73) Assignee: Nokia Corporation, Espoo (FI)

( * ) Notice: Subject to any disclaimer, the term of this patent is extended or adjusted under 35 U.S.C. 154(b) by 199 days.

(21) Appl. No.: 09/987,483

(22) Filed: Nov. 14, 2001

(65) Prior Publication Data

US 2002/0058494 A1 May 16, 2002

Related U.S. Application Data

(63) Continuation of application No. PCT/FI00/00429, filed on May 12, 2000.

(30) Foreign Application Priority Data

May 14, 1999 (FI) .................................................. 991105

(51) Int. Cl.$^7$ ......................... H04M 11/00; H04M 1/16; H04M 1/68; H04M 3/16
(52) U.S. Cl. ..................... 455/405; 455/406; 455/411; 455/558; 379/114; 379/17
(58) Field of Search ................................ 455/405, 406, 455/407, 408, 410, 411, 415, 422, 557, 558; 379/121.01, 115.02, 114.17

(56) References Cited

U.S. PATENT DOCUMENTS

| | | | |
|---|---|---|---|
| 5,819,178 A | | 10/1998 | Cropper |
| 5,898,915 A | * | 4/1999 | Reininghaus et al. ........ 455/406 |
| 6,029,062 A | * | 2/2000 | Hanson ........................ 455/408 |
| 6,052,604 A | * | 4/2000 | Bishop et al. ............... 455/558 |
| 6,134,431 A | * | 10/2000 | Matsumoto et al. ......... 455/411 |
| 6,216,014 B1 | * | 4/2001 | Proust et al. ................ 455/558 |
| 6,418,326 B1 | * | 7/2002 | Heinonen et al. ........... 455/558 |

FOREIGN PATENT DOCUMENTS

| | | |
|---|---|---|
| FI | 102020 B | 8/1996 |
| FI | 971224 | 10/1998 |
| WO | WO 96/13814 | 5/1996 |
| WO | WO 97/45814 | 12/1997 |
| WO | WO 98/34430 | 8/1998 |
| WO | WO 98/42173 | 10/1998 |

OTHER PUBLICATIONS

Mouly et al., The GSM System for Mobile Communications, France, 1992, 699 pp.

* cited by examiner

*Primary Examiner*—Edward F. Urban
*Assistant Examiner*—Simon Nguyen
(74) *Attorney, Agent, or Firm*—Pillsbury Winthrop LLP

(57) ABSTRACT

A method and system of offering wireless telecommunication services in a visited telecommunication network for a terminal device which does not have a first identifier accepted by the network. In the method, the visited network gives the terminal device a right to a temporary use of a telecommunication connection and establishes a connection with a third party in order to obtain a confirmation of paid services, for example. The third party checks a second identifier transmitted by the terminal device and transmits the confirmation to the visited network, which offers telecommunication services for the terminal device.

27 Claims, 3 Drawing Sheets

METHOD AND SYSTEM OF OFFERING WIRELESS TELECOMMUNICATION SERVICES IN A VISITED TELECOMMUNICATION NETWORK

This application is a Continuation of International Application PCT/FI00/00429 filed May 12, 2000 which designated the U.S. and was published under PCT Article 21(2) in English.

The invention relates to telecommunication service provision in a visited telecommunication system.

In mobile communication networks, a transmission path consists at least partly of a wireless section, whereby data is transmitted via the radio path. The radio path is a resource, which is physically open and which involves security risks. In digital mobile communication networks, various solutions for improving the security of data transmission, e.g. methods of encryption and user identification, have been developed. As an example, this application uses the second generation mobile communication system, the GSM system, in which a data transmission encryption can be used that is difficult to decrypt, whereby speech converted into a digital form and a data signal are encrypted, i.e. coded in a mobile station to be transferred over the radio path. Correspondingly, the encrypted transmission received in the GSM network is decoded into unencrypted speech and data. The encryption and user identification utilize encryption keys and algorithms, which are preferably only available for appropriate transmission and reception means.

To prevent misuses and secure charging in particular, a user identification is arranged in the GSM system. To profit from the services provided by the GSM system, a subscriber, which may be a different person than the real user of the mobile station, has to make an agreement with the operator possessing the network. To identify the user, for instance, the operator gives the mobile station user a so-called smart card comprising a SIM application (Subscriber Identity Module). In this application, a SIM card is regarded as a user-specific identifier, whereby the user is also a subscriber. The SIM card can naturally also be considered as a subscriber-specific identifier. Smart cards, such as a SIM card, comprise at least a microprocessor and memory. The user identification is typically arranged in smart cards by means of a PIN identifier (Personal Identity Number), and so the card can only be used by the user who knows the PIN.

SIM cards, too, use a PIN code to check the right user. Using information of the SIM card in a GSM connection set-up, a mobile station transmits the GSM network identification data, on the basis of which the SIM card and the user are identified. The SIM card particularly comprises information concerning the mobile operator, e.g. SIM card-specific user identifier IMSI (International Mobile Subscriber Identity) of the mobile communication services user and the temporary identifier of the location area TMSI (Temporary Mobile Subscriber Identity). The more detailed specifications of the SIM card are described in the GSM standard 11.11.

As a mobile station sets up a connection with the GSM network, the mobile communication network checks the TMSI, which the mobile communication network has allowed to be used instead of the IMSI, if the mobile station has been in the location area of the network in question last time when the connection was set up. If no TMSI is available, the mobile communication network requests the mobile station for the IMSI, which the mobile communication network checks from the home location register HLR. There-after, an authentication is typically performed, whereby it is checked that the SIM card is right and that it relates to the IMSI. The mobile station further comprises an identifier for the mobile station IMEI (International Mobile Equipment Identity), which can be used for checking, which mobile station is using the mobile communication network. A more detailed description of the GSM system can be found for example in the work "The GSM System for Mobile Communications", M. Mouly and M. Pautet, Palaiseau, France, 1992, ISBN:2-9507190-0-.

In this application, a home network refers to a mobile communication network, with which a mobile station user has an agreement, to which he has a right to access and from which he has received means for user identification in the GSM networks (i.e. a SIM card in the GSM system). A user has always a direct right to access to the home network. A visited network refers to a mobile communication network, to which a mobile station user has no direct right to access beforehand. When a mobile station is roaming, it is in some other area than that of the home network, i.e. in the area of a visited network. However, if a SIM card has been inserted into the mobile station, the visited network can, on the basis of the IMSI, contact the home network, which identifies the user, and the mobile station is offered services in the visited network, which means the user has a so-called indirect right to access to the network. This requires, however, that an agreement is made beforehand between the visited network and home network and that the telecommunication connections between them are working. The user has no right to access for example, when there is no functional SIM card in the mobile station or no roaming agreement exists between the visited network and home network. A mobile station without right to access refers in this application to a mobile station, whose user does not have a right to use telecommunication services of a visited network.

The use of GSM telecommunication services according to the GSM standards requires principally that a SIM card is inserted into the mobile station. As an exception to this, emergency calls can be made from various GSM mobile communication networks without a SIM card. In an emergency call, it is possible to contact the emergency number without that the user's SIM card would be identified. The emergency call solution can only be utilized when the call is made to specific emergency numbers.

However, all mobile station users do not want to commit themselves to services provided by a specific mobile communication operator, but they possibly want to select the operator they use at each time. People who use a mobile station seldom do not always want to make a special agreement, and many of them do not want to give their personalia to the mobile communication network. Because of charging problems, customers' creditworthiness is checked in many countries, before making mobile communication service agreements. Different GSM operators have offered various prepaid SIM cards, which can be bought like conventional telephone cards. Prepaid SIM cards can be used in the same way as conventional SIM cards; the difference is that telecommunication services have been paid for in advance. These prepaid SIM cards have proved to be very popular.

Smart cards have recently become more common as means of payment in particular. Instead of magnetic tape cards, for example, smart cards have been introduced in bank cards. Smart cards are planned to be used for securing electronic commerce via the Internet, for example. A smart card reader is connected to a computer, and using the information of the smart card, a user identification and encryption of a credit card number, for example, are performed. As the use of general-purpose payment applications based on a smart card become more popular, many mobile station users may want to use them for paying for mobile communication services as well.

The patent application WO 9834430 describes a method of allocating a temporary username from a wireless telecommunication network. In said publication, a mobile communication service is described, which is used without a previously made agreement and without a SIM card. According to the central idea of the publication, a mobile communication network can thus be contacted anonymously, and the network gives a temporary username for the duration of the call. By means of this identifier, the service offered for a specific mobile station is distinguished from the services of other mobile stations. This makes the use of mobile communication services more flexible and provides the user with more alternatives. The method described in the publication may well be used in free mobile communication services and also in the method of payment on a smart card, on which the mobile communication operator can rely.

A problem in the above arrangement is that it is not possible for the network operator to identify a user without identification means, such as a SIM card, and the payer of the bill, for example, cannot thus be guaranteed. The network operator has no guarantee of obtaining a compensation for the use of the telecommunication connection, unless some other reliable credit card is simultaneously charged. If the user remains unidentified, there is a growing risk of potential criminal actions, since the only identifier that is required is a mobile station identifier. According to the prior art, it is not possible to contact a visited mobile communication network, with which the home network does not have a roaming agreement.

The object of the invention is thus to provide a method and an apparatus for implementing the method such that the above problems can be avoided. The object of the invention are achieved with a method, a telecommunication system, and a network element which are characterized by what is disclosed in the independent claims. The preferred embodiments of the invention are disclosed in the dependent claims.

The method comprises the following steps: A connection is established from a terminal device to a fixed network providing network access for the terminal device. A first identifier of the terminal device is checked in the fixed network. A connection is established from the fixed network to a third party for obtaining a confirmation. A second identifier is transmitted from said terminal device to the third party for identification. The fixed network is replied with the confirmation given by the third party if the third party accepts the second identifier. The terminal device is allowed to use the telecommunication services of the fixed network in response to the confirmation from the third party.

According to a preferred embodiment of the invention, the use of telecommunication services is charged for on the basis of the confirmation transmitted by a third party.

According to a preferred embodiment of the invention, a third party identifier, such as a telephone number, is transmitted during a connection establishment from said terminal device to said fixed network, on the basis of which identifier a connection is established to said third party.

According to a preferred embodiment of the invention, a time limit is set for the duration of a telecommunication connection of said terminal device, a timer is activated when establishing the telecommunication connection of said terminal device and when the time measured by the timer exceeds the time limit, the offering of the telecommunication connection to said terminal device is prevented.

The invention is based on the idea that when a user (subscriber) of a terminal device, preferably a mobile station, does not have a (direct or an indirect) right to access to the fixed network, i.e. the terminal device cannot transmit an acceptable, a so-called first identifier, e.g. the IMSI of the SIM card, to the network, the fixed network, typically the visited network, allows a connection to be established to a third party preferably for user identification. The terminal device transmits a so-called second identifier, e.g. a digital signature of a payment application, to the third party. The third party identifies the user and, if the user is acceptable, informs the fixed network of having checked the user and preferably of ensuring the charging of the user. Thus, the visited network can offer telecommunication services in a manner requested by the terminal device, since the visited network has advantageously received a confirmation that the telecommunication services used by the terminal device will be paid for. The visited network may charge for the services according to charging instructions that are either received from the third party or are determined in advance. The service charging is addressed for example directly to the third party, which takes care of the further charging of the user. The third party can be contacted in order to verify the creditworthiness, for example, even if the visited network identified the terminal device user by means of a valid SIM card, for example.

According to a preferred embodiment of the invention, a mobile station transmits a third party identifier to the visited network during a connection set-up.

According to an embodiment, the visited network may require a confirmation from the third party each time the mobile station requests for a new telecommunication connection or only when the user registers in the network for the first time. Then, in accordance with a preferred embodiment of the invention, the visited network gives the mobile station a temporary user identity either for the duration of one telecommunication connection or for a longer time. The connection established to the third party to identify the user can according to an embodiment be time-supervised, too: if no confirmation from the third party is received within a pre-set time limit, the visited network disconnects the connection.

The method and apparatus of the invention provide the advantage that when a terminal device having no right to access to the visited network requests for telecommunication services from the visited network, a confirmation from a third party, e.g. from another mobile communication network or a credit company, can be transmitted to the visited network. On the basis of the confirmation, the visited network can thus have more confidence in receiving the payment for the services, for example, or in the user's identity. The solution of the invention enables a more flexible use of telecommunication services without an agreement made in advance, and the used telecommunication services can preferably be paid for by a current payment method of the third party.

The solution of the invention may also protect the real identity of a user from the visited network offering telecommunication services. This may be of use for example in a situation, in which a user is offered a chance of voting with his mobile station, whereby only an authority acting as a third party would identify the user. Further, the visited network can receive extra income by charging via the third party also those users for the services that have not made an agreement with the visited network. In accordance with an embodiment of the invention, the visited network can restrict users having no right to access from using telecommunication services preferably by setting a certain time when the offering of telecommunication services is allowed and thus making the risk of misuses smaller.

In the following the invention will be described in greater detail in connection with the preferred embodiments with reference to the attached drawings, in which FIG. 1 shows a simplified view of a mobile communication system in which the invention can preferably be applied;

Figure 1:
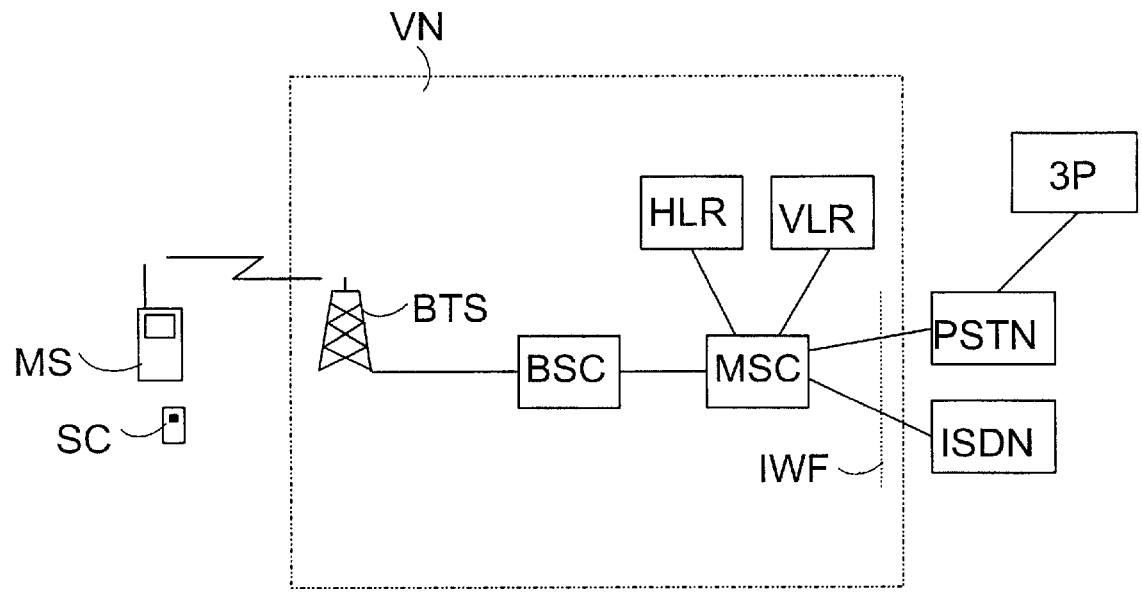

The invention can be applied to any telecommunication system in various situations, particularly to mobile communication systems and situations in which the mobile station user establishing a connection with a mobile communication network has no right to use network services. In the solution of the invention, connections can also be established from a mobile communication system to any telecommunication network. In the following, the invention is described in the GSM system according to FIG. 1, the system comprising at least one mobile station MS and a mobile communication network VN, which is a visited network.

A visited network VN comprises one or more base transceiver stations BTS, which use radio frequencies and channels that are controlled by a base station controller BSC. There is a connection from the base station controller BSC to a mobile services switching center MSC, which is responsible for call set-ups and for routing calls to right addresses. Two databases comprising information on mobile station subscribers are used in this: a home location register HLR and a visitor location register VLR. The home location register HLR comprises information on all subscribers of the visited network VN and the services they have subscribed to, the visitor location register for its part comprises information on mobile stations visiting the mobile services switching center MSC area of the visited network VN. The mobile services switching center MSC and the visitor location register VLR are typically integrated into each other, and the abbreviation MSC/VLR can also be used for the mobile services switching center implementing the functions of the visitor location register VLR.

The mobile services switching center MSC is in connection with other telecommunication networks, e.g. the PSTN (Public Switched Telephone Network) or the ISDN (Integrated Services Digital Network), via an interworking function IWF. The interworking function IWF is responsible for adjusting the telecommunication between the GSM system and other telecommunication networks. For example, the interworking function IWF typically comprises a modem for the PSTN. A third party 3P may establish a connection to the PSTN. A smart card SC can be inserted into a mobile station MS.

The description of the invention includes an example, in which a mobile station MS does not have a right to access to the visited network VN and there is no functional SIM card in the mobile station MS. Thus, there is no user identity that can be accepted by the visited network available. The solution of the invention can also be applied to cases, in which the home network providing a SIM card connected to a mobile station MS has no valid roaming agreement with the visited network. The GSM mobile station does not have a right to access to the GSM network either, if the IMEI identifier is on a so-called black list, which means that the mobile station is typically stolen. Mobile stations on the black list, having no right to access to the network on the basis of the IMEI, are not provided with telecommunication services.

The mobile station MS of the invention can be used without a SIM card, or some other, preferably a smart card SC which is shaped like a SIM card, can be inserted into a SIM card reader or a corresponding card reader. In the following example, a smart card SC comprising a payment application is inserted into a mobile station MS. The payment application of the example is for credit card payments, i.e. the payment application provider charges the party to be charged in arrears. The invention can also be applied to mobile stations MS without a smart card or a payment application. The mobile station MS itself can also comprise a payment application, instead of a smart card SC.

Figure 2:
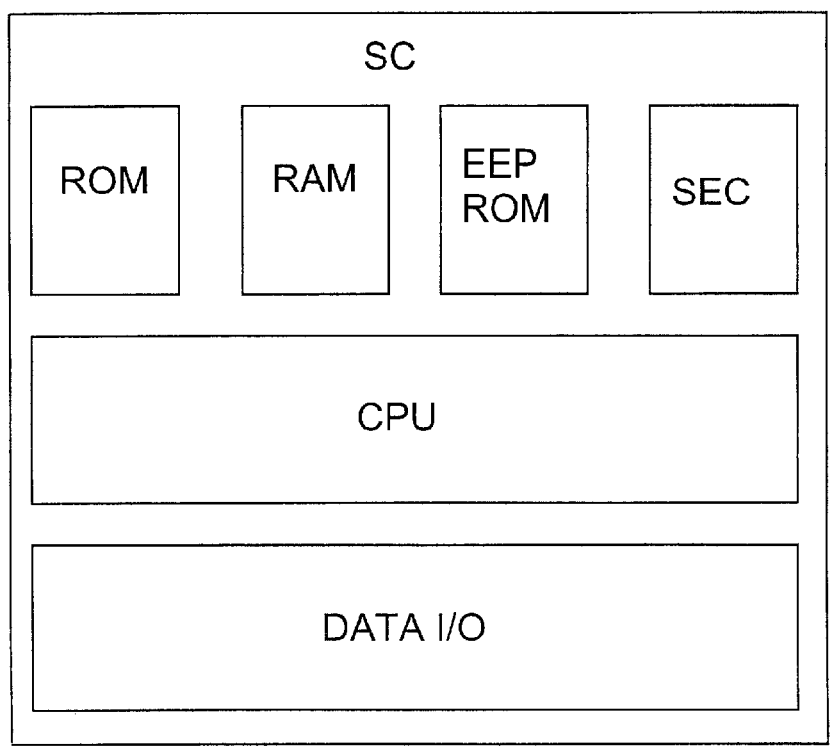
FIG. 2 shows a simplified block diagram of an internal structure of a smart card.

According to the invention, mobile station MS functions can be used, although a SIM card is not inserted into the mobile station MS. The user inserts a smart card SC comprising a payment application into the mobile station MS. FIG. 2 shows a simplified block diagram 20 of an internal structure of the smart card SC known per se. A smart card SC is typically a plastic card having a size of a credit card, and typically an integrated circuit is laid therein. In addition, there are electric contacts on the smart card SC surface, which help to transmit operating voltages to the card and to transfer control signals and data signals between a smart card reader, such as the mobile station MS and a bus adapter DATA I/O of the smart card SC. Thus, data is transmitted between the smart card SC and the mobile station MS through the bus adapter DATA I/O.

A central processing unit CPU controls the operation of the smart card on the basis of a program code stored in the read only memory ROM. Different user-specific data, which remain permanently in the memory, can be stored in the electrically erasable programmable read-only memory EEPROM. For example, a payment application may be stored in the EEPROM. The information contained in the smart card SC is arranged in different directories, and the card and external apparatuses have different rights to access to them. Random Access Memory RAM can be used as a temporary storage of information. To ensure a secure usage of the smart card SC has a security function SEC, which checks the PIN, for example. The mobile station MS comprises means for using the smart card SC, e.g. means for reading the electric contacts of the smart card SC and means for writing into the smart card SC memory.

In the following, the activation of a smart card SC and a payment application contained therein is described by way of example. The smart card SC is inserted into a mobile station MS, which connects an operating voltage to it. The smart card SC transmits the mobile station MS information on its properties, e.g. the protocols it supports and manufacturing information. The mobile station MS is able to use the smart card SC, and the PIN of the mobile station MS user is checked by means of a user interface, e.g. a keyboard, microphone or a pressable display screen. The security function SEC checks, whether the entered PIN is right, after which the smart card SC can be used. This way is can be ensured that only the user knowing the PIN can utilize the smart card SC. A user can also be identified in any other way, for example by using fingerprint recognition. The mobile station MS preferably reads the identifiers of the smart card SC directories, on the basis of which it detects that the smart card in question does not have a SIM card identifier of the GSM. In accordance with the invention, the mobile station MS can, however, be used, and a call to the visited network VN can be set up also when it deals with other services than an emergency call service.

The mobile station MS can preferably transmit the user the information on applications the smart card SC comprises and on the fact that it does not deal with a SIM card. The user selects a payment application, and the payment application of the smart card SC is activated. A condition for the payment application activation can be a separate user check, for example a separate check of a second PIN2.

Figure 3:
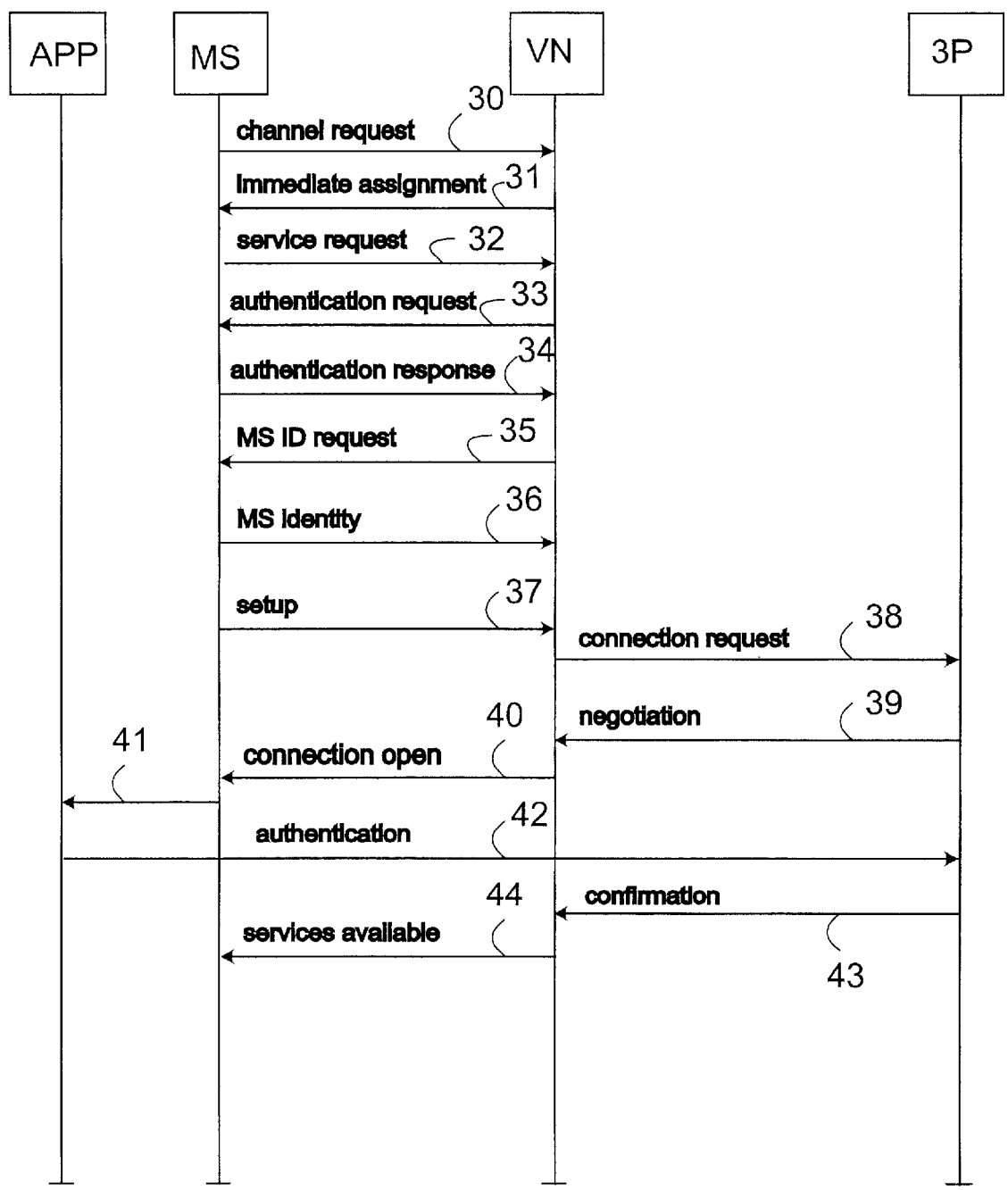
FIG. 3 shows a simplified signalling diagram illustrating the method of the invention.

In the following the solution of the invention is illustrated by a simplified signalling diagram of FIG. 3, which shows a mobile MS-originated telecommunication service, whereby no connection is yet established to the visited network VN. In the example of FIG. 3, the invention is applied in the GSM system signalling, but the invention can also be applied in any other telecommunication system signalling. The mobile station MS is activated by switching it on and the smart card SC comprising also a payment application APP is inserted into the mobile station MS and activated for example in the above manner.

When the mobile station MS user has for example selected the number to be dialled and activated a service request for example by pressing a "call" key, the mobile station begins signalling with the visited network VN. Depending on the implementation, other ways of selecting telecommunication services and detecting the target of the desired connection can also be used. It is also possible that multiple telecommunication services are requested from the visited network VN. However, only one telecommunication service can typically be requested at a time. First, the mobile station MS requests for a free signalling connection (channel request, arrow 30) from the visited network VN. If a free signalling channel is found, the visited network VN transmits the information on the signalling channel to the mobile station MS (immediate assignment, arrow 31).

Next, the mobile station MS transmits a request for connection origination (service request, arrow 32) on an assigned signalling channel. In a typical GSM call, the mobile station transmits either a TMSI or an IMSI identifier to the visited network in the request for connection origination. The network typically requests for the IMSI separately, if the TMSI is not known. Since neither of the identifiers is available, the mobile station MS either sends a message with an empty field in the space reserved for the TMSI or IMSI or it reports that it does not have a user identity. This can preferably be reported in the same message and in the same form as the IMSI or TMSI, differing, however, from the values reserved for them. The form described for example in the publication WO 9834430 can be used. The publication WO 9834430 describes a data field, in which the bits [0 0 0] refer to the type of username that is used for a mobile station having no right to access.

A third party 3P identifier can also be transmitted in the field reserved for the IMSI/TMSI. In this case, the visited network VN would distinguish on the basis of a certain number, for example, that it deals with a third party identifier and that there is no IMSI identifying the user available. The third party can be contacted in the manner described later. Thus, the visited network VN can already at an early stage of a call set-up check the third party identifier for example from the register of the network. Based on this, the visited network VN can decide, whether it wants to reserve a temporary user identity for the mobile station MS which has no right to access.

The visited network VN receives the request for connection origination of the mobile station MS, which is preferably interpreted in the mobile services switching center MSC/VLR. Then, after detecting that the mobile station MS has not transmitted the user identity, the visited network VN may give a right to a temporary telecommunication connection for the mobile station MS, although it does not contain a SIM card providing the right to access.

The visited network VN may preferably give the mobile station MS a temporary user identity for example in the manner described in the publication WO 9834430. The visited network VN, preferably the visitor location register VLR, comprises numbers for the temporary user identity and means for marking the numbers as reserved or available. The visited network VN reserves for the mobile station a temporary user identity that is available at that time and transmits it to the mobile station MS in a message, in which a request for check of rights (authentication request, arrow 33) is typically transmitted. Thereafter, the temporary user identity is used in a connection establishment, and when the mobile station MS has received it, it transmits a confirmation message (authentication response, arrow 34). In a typical GSM connection, the authentication of the previous messages 33 and 34 cannot be performed, since neither a SIM card nor an IMSI is available. The visited network VN preferably uses the assigned temporary user identity as the mobile station MS identifier so long the mobile station MS is in any kind of connection with the visited network VN.

According to a preferred embodiment of the invention, the visited network VN sets a certain time limit, and when this time limit is exceeded, the telecommunication connection is no longer offered for the mobile station MS. As the visited network VN is not certain of the payment of the use of the telecommunication connections, it may restrict the duration of the mobile station's MS use of the telecommunication connection with the time limit. The visited network VN preferably aims at receiving a confirmation of the payment within the time limit. When the visited network VN has received the confirmation of the payment, the time limit for the use of the telecommunication connection can be deleted.

The visited network VN comprises a time-measuring timer, preferably in connection with the mobile services switching center NSC/VLR. A time limit is stored in connection with the timer. For example, the timer can be switched on, when, after receiving a request for connection origination (service request, arrow 32), the mobile services switching center NSC/VLR of the visited network VN detects that the mobile station MS has no right to access to the network, whereby the visited network VN gives the mobile station MS a temporary user identity. The timer compares the time spent on the use of the telecommunication connection assigned to the mobile station with the set time limit. The visited network VN disconnects the telecommunication connection of the mobile station MS, when the timer indicates that the duration of the telecommunication connection has exceeded the determined time limit of the timer.

Thus, the visited network VN can easily control contacts without access rights and preferably allow a contact with the third party 3P only. If necessary, the visited network VN may preferably change the time limit. For example, if the network is heavily loaded, the time limit may be shorter than in the case the network had a lot of capacity. Other methods exist as well, e.g. a register of the amount of connection attempts can be formed for the mobile station MS on the basis of the IMEI. Thus, the amount of connection attempts can be restricted to the level selected by the visited network VN.

The visited network preferably transmits a check request of the mobile station equipment identity (IMEI) to the mobile station MS (MS ID request, arrow 35). The mobile station MS transmits the IMEI (MS identity, arrow 36) to the visited network VN. The visited network VN checks the equipment identity register EIR comprising information on the mobile stations for which no telecommunication services are offered. In a GSM call establishment, the mobile services switching center NSC/VLR typically transmits the mobile station MS a request for starting an encryption, whereafter the mobile station MS replies to it and starts the encryption. Depending on the mobile station MS implementation, the encryption cannot necessarily be implemented in the solution of the invention, if the mobile station lacks a SIM card, and the encryption activation message need not be transmitted.

Data that are transmitted over the radio path need not necessarily be encrypted; the payment application of the smart card SC preferably encrypts the information used for identification in a manner which is described later. User data transferred over the radio path need not often be encrypted. The mobile station MS can also comprise an encryption key required for the encryption. For example, a mobile-specific encryption key, which the network can preferably detect by means of the IMEI, may be stored in the mobile station. It is also possible that the visited network transmits the encryption key to be used safely to the mobile station MS during the connection establishment.

The mobile station MS transmits a connection set-up message (set-up, arrow 37) to the visited network VN. The connection set-up message comprises e.g. the dialled number that the user wants to call and the information on the telecommunication services that are required by the mobile station MS.

Typically, the GSM network would now, at the stage of having received the target identifier, start to route the connection to the telecommunication network according to the number to be dialled. According to a preferred embodiment of the invention, the visited network VN contacts the third party 3P, which gives the visited network VN a confirmation of paid telecommunication services or the user identity, for example. For this purpose, the mobile station MS preferably transmits the third party 3P identifier to the visited network VN. The third party identifier can already be transmitted when the request for connection origination (service request, arrow 32) has been sent.

According to a preferred embodiment of the invention, a connection set-up message (set-up, arrow 37) also comprises a third party 3P identifier, preferably a telephone number. The identifier has been received for example from the payment application APP of the smart card SC. The mobile station MS combines the identifier received from the payment application APP with the connection set-up message (set-up, arrow 37) such that it can be distinguished from the actual telephone number of the target to be called. A third party identifier can e.g. be found in the field of a number to be called in the connection set-up message and the telephone number of the target to be called can be transmitted as a so-called Facility message. A Facility message is typically used for transmitting connection-related information between the mobile station and the network either as a separate message or as combined with some other message. The telephone number of the target to be called can preferably be transmitted in the connection set-up message as a Facility message.

A third party 3P identifier can also be received from the mobile station MS or the user, and it may also be some other type of identifier than a telephone number, an IP address, for instance. The visited network VN detects that the connection set-up message (set-up, arrow 37) comprises a third party 3P identifier and a Facility message. The visited network VN preferably stores the number of the target to be called contained in the Facility message in the memory of the mobile services switching center MSC/VLR, for example.

The visited network VN starts taking measures in order to establish a connection with the third party 3P on the basis of its identifier. The visited network VN may be aware of the identifier in advance or the mobile station MS may transmit it in a connection set-up message (set-up, arrow 37) during a call establishment in accordance with the above description. In the current example, a connection to the PSTN network (connection request, arrow 38) is set up on the basis of the third party 3P telephone number. The connection establishment from the GSM network to the PSTN network according to the given telephone number is known from the prior art, and it is not needed to explain herein in greater detail. The connection between the networks can for example be established in accordance with the SS7 standard (Signalling System No. 7). It is obvious that the solution of the invention can also be utilized in establishing a connection with other telecommunication networks, such as the ISDN or PDN (Packet Data Network). The visited network VN and the third party 3P may know one another in advance, and the visited network VN can preferably transmit a certain message, on the basis of which the third party 3P detects that it deals with a confirmation message.

According to the invention, a third party 3P can be any party comprising means for establishing a telecommunication connection with a visited network VN and for identifying a user or an application used. A third party 3P can be a bank server, for example, whose payment application APP is included in the smart card of the user. Further, a third party 3P may be a server controlled by a public authority, which is capable of identifying the user reliably. A telecommunication system belonging to some other mobile operator can also be a third party 3P, and calls can be made preferably according to the invention without a valid roaming agreement.

The third party 3P receives a request for connection origination from the visited network VN and a telecommunication connection is established between them according to the prior art (negotiation, arrow 39). Preferably the visited network VN and the third party 3P identify one another, for example with the help of a public-key technique, which will be described later. When a reliable telecommunication connection is established, the visited network VN reserves a traffic channel for the mobile station MS and transmits the information to the mobile station MS (connection open, arrow 40). A data service according to the GSM standard, e.g. an NT (Non-Transparent) connection with the rate of 9600 bits/s, is preferably reserved for the mobile station MS. After this, the telecommunication connection between the mobile station MS and the third party 3P can be used. The mobile station MS further transmits the information to the payment application APP of the smart card (arrow 41).

In order for the third party 3P to be able to rely on the user, or on the payment application APP of the user, as in the example, and to give a confirmation to the visited network VN, the third party 3P has to identify the payment application APP. The payment application APP transmits its identification data to the mobile station MS, which further transmits the identification data to the visited network VN, which in turn transmits the identification data to the third party 3P (authentication, arrow 42). The identification data preferably verified by a digital signature are transmitted in a safe form such that the visited network VN or the mobile station MS is not able to detect them. It is also possible that the third party 3P requests for the identification data, after which the payment application APP replies by giving the identification data for example in the following way.

Figure 4:
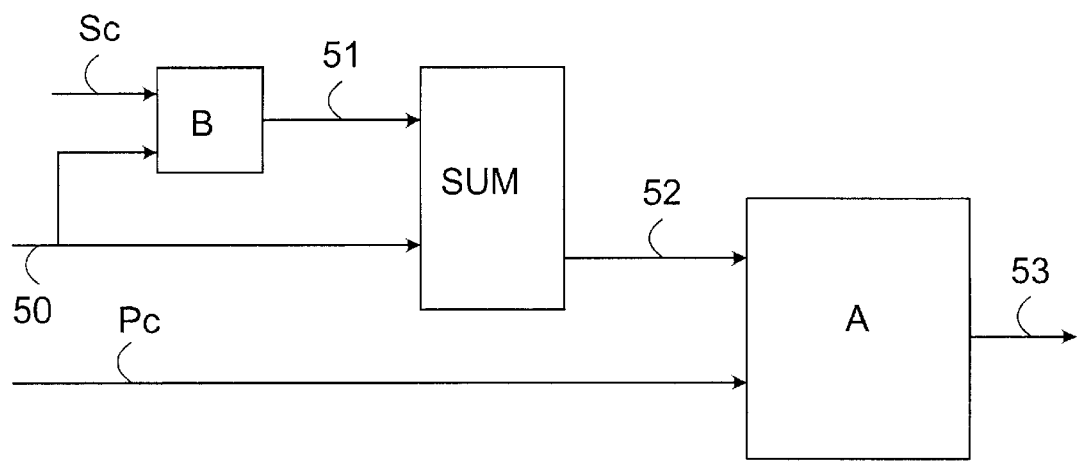
FIG. 4 shows a method of encryption and identification according to a public-key technique by way of example.
Figure 4:
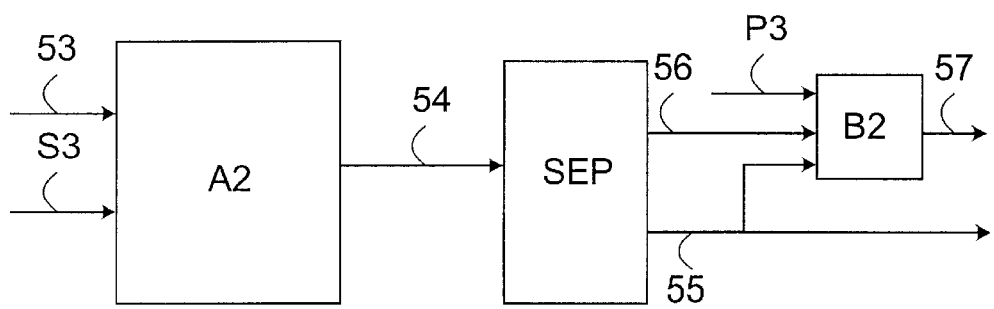

The identification method used varies depending on the used application. One alternative is a so-called public-key cryptography. In the following, a message encryption according to the public-key technique and a digital signature are described in FIG. 4. A digital signature can be used as a preferred embodiment of the invention for authenticating different parties. Typically, when text is encrypted, an algorithm and an encryption key are used, which help to code the unencrypted text to encrypted text. Only the possessor of the right key can correspondingly decode the encrypted text to unencrypted text.

Two types of keys are used in the public-key technique: public and secret keys. The payment application APP on the smart card SC comprises a secret key Sc, which is only known by the third party 3P and its payment application APP. The third party 3P has the corresponding secret key S3. The payment application APP of the smart card SC further comprises a public key Pc, and the third party has the corresponding key P3. The public-key method is based on the idea that a public key is used in transmitting a message and a secret key in receiving the message. Then anyone who is aware of the public key can code the message, but only the possessor of the right secret key can decode the message.

In the following, a message encryption and sender identification, in which a digital signature is used and which are implemented according to the public-key method, are described by way of example. A payment application APP comprises two algorithms A and B. A is for encrypting a message and B is for forming a digital signature. A message 50 is delivered to the algorithm B, and by using a secret key Sc, the algorithm B forms a digital signature 51. The message 50 is unencrypted and may comprise information transmitted by the payment application, for example. The digital signature 51 is combined with the message 50 in a summer SUM, and this combination 52 is further delivered to the algorithm A. The algorithm A forms the combination 52 and a message 53 coded by means of a public key Pc. RSA (Rivest-Shamir-Adleman) is a very well-known algorithm used in the public-key method, and it can be used in the solution according to the example.

The mobile station MS receives the coded message 53 and transmits it further to a visited network VN, which then transmits it to a third party 3P (not shown). Only the third party 3P can decode the encrypted message 53, since it has a secret key S3 relating to the public key Pc of the payment application of the embodiment. The public key Pc can be transmitted in the coded message 53 completely unencrypted, whereby the third party can easily select the right secret key S3. The algorithm A2 of the third party 3P decodes the coded message 53 by using the secret key S3. Compared with the coding algorithm A, the decoding algorithm A2 takes opposite measures. The combined decoded message and digital signature 54 are taken to a separator SEP, which separates the decoded message 55 and the digital signature 56. The decoded message 55 and the digital signature 56 are taken to an algorithm B2, which produces information 57 on the reliability of the digital signature by using the public key P3. On the basis of the information 57 it can be found out, whether the digital signature comes authentically from the same party as the public key 3P. By using this information, it can thus be ensured that the message sender is the payment application APP on the smart card SC. The algorithm B2 decoding the digital signature is a reversal of the algorithm B.

This way, the third party 3P can become certain of the reliability of the payment application and of the user reliability as well, since the payment application APP of the smart card SC cannot be activated without the right PIN code. Correspondingly, the public-key method can, if required, be used for identifying the third party 3P in the payment application APP. The public-key method can also be used when the visited network VN and the third party 3P are identifying one another. In addition to the identification, the payment application APP may transmit the third party 3P other information as well, e.g. concerning the properties of the payment application APP.

Identification data (authentication, arrow 42) transmitted from the mobile station MS to the third party 3P can also be something else than the identifier transmitted by the payment application APP. It may comprise e.g. identification data of the user, the mobile station MS, the smart card SC or some other application. A specific combination of characters, for example, can be used as a user identifier, which is entered by the user by means of a user interface to the mobile station MS.

The third party 3P receives the identification data (authentication, arrow 42) and identifies the payment application APP reliably and thus the user of the payment application APP. The third party 3P identifies the payment application APP and the user to be its own and is according to a preferred embodiment ready to pay for the telecommunication services to the visited network VN in arrears. The payment may be charged from the user's account on the basis of a previously made agreement on payments.

The third party 3P preferably transmits a confirmation of the payment of the charge to the visited network VN (confirmation, arrow 43). It is preferable to use a previously agreed practice for confirmation transfer between the third party 3P and the visited network VN. For example, a specific set of numbers, such as 111, is used to indicate that the user in question is reliable and that the payments for the telecommunication connections will be taken care of. Correspondingly, the set of numbers 100 can be used to indicate that the user reliability is not guaranteed and that the third party 3P cannot take care of the payment. Since the visited network VN and the third party 3P have preferably already identified one another in the connection establishment (negotiation, arrow 39), the visited network VN can rely on the third party 3P.

The confirmation (arrow 43) preferably comprises charging instructions, on the basis of which network elements responsible for the charging are arranged to charge the telecommunication connection offered to the mobile station MS. For example, the information on the third party 3P is stored in the server responsible for the charging, whereby the charging parameters formed during the telecommunication connection are directed to the third party 3P. As a mobile station MS identifier, a temporary user identity or an IMEI code can preferably be used. On the basis of the telecommunication services used by the mobile station MS, the charging center forms a charge which is sent to the third party 3P e.g. electrically. Preferably the charge also comprises an identifier, e.g. the name of the user, transmitted by the third party 3P, and the third party 3P can easily handle the charge. The visited network VN may transmit the information on the service providence and the made payment to the mobile station MS (services available, arrow 44). At this stage, the visited network VN can give up the timer function, as the offered telecommunication connection can be charged.

As the payment application APP of the example is similar to a credit card, the third party 3P charges the visited network VN in arrears on the basis of the received charge. If the payment application were charged directly in connection with the service, the visited network VN has to be able to operate in the manner defined by the payment application. The third party 3P can transmit exact instructions concerning the charging from the payment application, or the visited network VN and the payment application can negotiate for the payment protocol to be used. In this case, the visited network VN has to transmit the charging information on the used telecommunication services to the payment application on the smart card, which payment application decreases the amount of money stored in the application in accordance with the charging information, for example.

The solution of the preferred embodiment of the invention provides the advantage that, after taking the previously described measures, the visited network VN can now offer the mobile station MS the services it requires and will receive a confirmation of the payment from the third party 3P. The confirmation (arrow 43) transmitted from the third party 3P to the visited network VN can naturally also be for some other purpose than for the confirmation of the payment, like for delivering information of the user identity.

The visited network VN can now start the connection establishment to the network according to the number to be called, which is earlier transmitted by the mobile station MS and stored in the visited network VN. The visited network VN thus transmits a request for connection origination to the network according to the number to be called according to the known GSM technique, and the connection is established between the network and the mobile station MS. The telecommunication connection between the visited network VN and the third party 3P can be disconnected and a traffic channel allocated to the mobile station MS can be used, where possible, according to the service required by the mobile station MS. If the traffic channel allocated for identifying the payment application APP is not suitable for the service the mobile station MS requires, the visited network VN preferably allocates the traffic channel according to the request of the mobile station MS and disconnects the connection allocated for the identification of the used payment application APP. Thus, the data connection reserved for the mobile station MS may be disconnected and a traffic channel suitable for a speech connection may be reserved to replace it. If a connection can be established with the dialled telephone number, the mobile station MS user obtains the desired service and the visited network VN can preferably charge the third party 3P for the used service.

Instead of the IMSI or TMSI of a typical GSM connection, a temporary user identity can preferably be used as user identifier, when the mobile station MS is in connection with the visited network VN. The mobile station MS can also require new telecommunication connections, to activate the GPRS (General Packet Radio Service) connection, for instance, or to use short message services (SMS). The visited network VN may also demand a confirmation from the third party 3P every time the mobile station requires a new telecommunication connection. It is also possible to restrict the use of the temporary user identity e.g. temporally, by setting a certain time limit for the validity of the user identity, after the third party 3P confirmation has been received. If the time limit of the validity is exceeded, telecommunication services are no longer offered to the mobile station MS. The use of a temporary user identity may be controlled by a timer, and after the timer goes off, a new confirmation must be obtained from the third party.

If the mobile station MS moves outside of the area of the mobile services switching center of the visited network VN, the connection can be subordinated to another mobile services switching center. Then the temporary user identity used by the mobile services switching center of the visited network VN becomes available and the other mobile services switching center reserves a new temporary user identity for the connection.

When there are no longer telecommunication connections from the mobile station MS to the visited network VN, the visited network VN can also make the temporary user identity available for the mobile stations which have no right to access and which require telecommunication services. Information on the third party 3P and the user stored in the visited network VN can also be deleted after a charge has been transmitted and paid for. However, if the information is not deleted, it can possibly be used later, if the same payment application is being used and the same mobile station MS without a right to access tries to contact the visited network VN again. Thus, it is still necessary for the third party 3P to identify the user.

In one geographical area there are often mobile communication networks that are maintained by more than one mobile operator. The mobile station MS can thus search the mobile communication networks that can be distinguished in the coverage area of the mobile station MS and it can inform the user of them on the mobile station MS display, for example. The user can preferably select the mobile communication network of the desired operator, with which network a connection can be established.

A connection establishment and service providence described above show only one example, but the invention can be applied to other telecommunication networks as well, and the connection can also be established in a different manner than above.

The invention can also be implemented such that when the mobile station MS without a right to access is activated, i.e. when it is switched on, a connection is established with the visited network VN. Then the mobile station MS is activated to a standby mode in the visited network VN, and the user may activate telecommunication services later. In this case, similar procedures as above can be carried out, and no telephone number to be called nor the information on the telecommunication services required by the mobile station MS are transmitted in a connection set-up message (set-up, arrow 37). Identification data transmitted by the mobile station MS can be checked by the third party 3P in the above manner. On the basis of a confirmation obtained from the third party 3P, the visited network VN can then register the mobile station MS to a standby mode in the same manner as other mobile stations located on its network area, too. If the user requires e.g. a speech service later on, the visited network VN can preferably utilize the temporary user identity assigned already earlier and the information received from the third party 3P, and transmit a request for connection origination directly to the desired telephone number after receiving the connection set-up message.

According to a preferred embodiment of the invention, a third party 3P can be some wireless telecommunication system. It can be a GSM system, for example; the mobile station MS contacting a visited network VN may have a SIM card, which is provided by a home network that has no valid roaming agreement with the visited network VN. In this case, the visited network VN transmits the identification data, e.g. the IMSI, included in the SIM card to the home network, which identifies the identification data from the home location register HLR and can perform the SIM card authentication. If the SIM card belongs to the home network, the home network preferably gives the confirmation and the required charging instructions to the visited network VN.

This way the visited network VN could offer telecommunication connections to users whose home network has not made a roaming agreement with a visited network VN earlier. This requires functional telecommunication connections between the visited network VN and the home network. The connection establishment practice can preferably be similar as between the networks that have made a roaming agreement. As the mobile station MS is provided with a SIM card, the traffic over the radio path can be encrypted in a similar manner as in roaming calls according to the prior art. The invention can also be applied when the network operator responsible for the telecommunication network is not the same as the service provider selling telecommunication services. The service provider can in this case be a third party, from which the network operator may require a confirmation.

The invention is also applicable to mobile-terminated calls. Thus, a so-called user or mobile station call identity would be stored in the visited network, on the basis of which call identity the network could send a page message to a right network in which the mobile station, preferably identified by the third party, is registered. This way it is possible to establish a connection to the mobile station using said call identity.

According to a preferred embodiment of the invention, a third party can be contacted, even though the visited network identified the mobile station user by means of a valid SIM card, for example. A third party may in this case be e.g. a credit company, which may verify the user's creditworthiness. If the third party gives its confirmation preferably within a certain time limit, services can be offered to the mobile station according to the known GSM technique, for example.

To make data transmission more effective, a packet radio service GPRS has been developed for the GSM mobile communication networks. The invention is also applicable to the GPRS system (not shown). A mobile station makes a packet-switched attachment (GPRS attach) to the SGSN element (Serving GPRS Support Node) of the GPRS network. If there is no SIM card available, the mobile station cannot transmit the IMSI or TMSI, but it preferably sends a message described above, which does not comprise a user identifier. On the basis of this message the GPRS network detects that the mobile station requiring a connection does not have an acceptable SIM card. The mobile station may further transmit the GPRS network a third party identifier, so that the GPRS network may be certain of the real nature of the connection request. The GPRS network preferably switches on the timer, as described above. If the timer exceeds the value determined for it, the GPRS network disconnects the connection.

The authentication and encryption messages are not transmitted between the network and the mobile station, as there is no SIM card available. If possible, the GPRS network may also request for the IMEI of the mobile station. The GPRS network informs the mobile station of the accepted attachment, which message preferably also comprises a TLLI identifier (Temporary Logical Link Identity) for a later use. The GPRS network may also reject the connection request by means of an attach reject message.

When the mobile station has registered in the GPRS network, it sends a so-called PDP (Packet Data Protocol) context activation request, which preferably comprises an IP address of a third party. The third party 3P is contacted and the user or the application can be identified in the manner described above, for example. After identifying the user, the third party may transmit the GPRS network a confirmation, on the basis of which the user is preferably charged. The activated PDP context need not necessarily be removed, but it can be used according to the known GPRS technique in the manner required by the user.

So-called third generation mobile communication systems have been developed all around the world. These third generation mobile communication systems will utilize similar means for user identification as a SIM card. For example, 3GPP ($3^{rd}$ Generation Partnership Project) is standardising a third generation mobile communication system based on the GSM network, which includes e.g. a new radio interface. A GSM core network will be utilized in the system developed by the 3GPP, whereby the connection control and mobility management will resemble one another considerably.

USIM (Universal Service Identity Module) is an application standardised by the 3GPP, which is based on the SIM card of the GSM system and which will be used for user identification, for example. To implement interoperability, e.g. a handover, between the 3GPP third generation mobile communication system and the GSM system, a GSM SIM functionality along the USIM application may be implemented as such in the same smart card. The invention is also applicable to the third generation mobile communication systems.

It will be apparent to a person skilled in the art that as the technique develops, the basic idea of the invention may be implemented in a variety of ways. The invention may preferably also be applied to other terminal devices than mobile stations, such as to telephone boxes or a computer with functions required by a mobile station. Thus, the invention and the embodiments thereof are not restricted to the above examples, but may be modified within the scope of the claims.

What is claimed is:

1. A method of providing telecommunication services in a telecommunication system, the system including at least one terminal device and a fixed network providing network access for said terminal device, the method comprising:

establishing a connection from said terminal device to said fixed network, checking a first identifier of said terminal device in said fixed network, transmitting a third party identifier from said terminal device to the fixed network, establishing a connection from said fixed network to a third party other than a called party on the basis of the received third party identifier for obtaining a confirmation, transmitting a second identifier from said terminal device to the third party for identification, replying to said fixed network with the confirmation given by the third party in response to the third party accepting the second identifier, allowing said terminal device to use the telecommunication services of said fixed network in response to the confirmation of the third party, and initiating a connection establishment to a network according to a number to be called.

2. A method as claimed in claim 1, wherein the connection from said fixed network to the third party is established in response to said terminal device not having the first identifier accepted by said fixed network.

3. A method as claimed in claim 1, further comprising charging for the use of telecommunication services on the basis of the confirmation transmitted by the third party.

4. A method as claimed in claim 3, wherein the third party is charged for the use of the telecommunication services.

5. A method as claimed in claim 1, wherein the third party identifier is a telephone number.

6. A method as claimed in claim 1, further comprising:

setting a time limit for the duration of a telecommunication connection of said terminal device, activating a timer when establishing the telecommunication connection of said terminal device, and preventing the offering of the telecommunication connection to said terminal device when the time measured by the timer exceeds the time limit.

7. A method as claimed in claim 1, further comprising reserving a temporary user identity for said terminal device to said fixed network.

8. A method as claimed in claim 7, further comprising:

setting a time limit for the validity of said user identity, and rejecting to offer telecommunication services for said terminal device if the time limit is exceeded.

9. A method as claimed in claim 1, wherein the third party identifies a terminal device user via the second identifier.

10. A method as claimed in claim 9, wherein the third party identifies the user every time the user requires a telecommunication service.

11. A method as claimed in claim 1, wherein said telecommunication system is wireless and said terminal device is a mobile station.

12. A method as claimed in claim 1, wherein said terminal device is provided with a smart card, whose application includes the second identifier, which is transmitted to the third party.

13. A method as claimed in claim 12, wherein the application of said smart card is a payment application comprising the second identifier.

14. A method as claimed in claim 12, wherein the application of said smart card is a SIM application, and that the third party is another wireless telecommunication system.

15. A method as claimed in claim 1, wherein a public-key identification method is employed.

16. A telecommunication system comprising at least one terminal device and a fixed network providing network access for said terminal device, wherein said terminal device is configured to transmit a third party identifier to said fixed network during connection establishment, said fixed network is configured to check a first identifier of said terminal device, said fixed network is configured to establish a connection to a third party other than a called party on the basis of the received third party identifier for obtaining a confirmation, said terminal device is configured to transmit a second identifier to the third party for identification, the third party is configured to transmit the confirmation to said fixed network in response to the third party accepting the second identifier, said fixed network is configured to offer telecommunication services for said terminal device in response to the confirmation of the third party, and said fixed network is configured to initiate a connection establishment to a network according to a number to be called.

17. A system as claimed in claim 16, wherein said fixed network is configured to establish a connection to the third party in response to said terminal device not having the first identifier accepted by said fixed network.

18. A system as claimed in claim 16, wherein said fixed network is configured to charge for the use of telecommunication services on the basis of the confirmation transmitted by the third party.

19. A system as claimed in claim 16, wherein the third party identifier is a telephone number.

20. A system as claimed in claim 16, wherein said fixed network is configured to reserve a temporary user identity for said terminal device to the fixed network.

21. A system as claimed in claim 16, wherein said telecommunication system is wireless, and said terminal device is a mobile station.

22. A system as claimed in claim 16, wherein said terminal device comprises means for using a smart card in the terminal device, the terminal device, and said fixed network is configured to transmit the second identifier of an application of the smart card to the third party.

23. A system as claimed in claim 22, wherein the application of the smart card is a payment application comprising the second identifier.

24. A system as claimed in claim 22, wherein the application of said smart card is a SIM application and that the third party is another wireless telecommunication system.

25. A system as claimed in claim 16, wherein at least said smart card and the third party are configured to employ a public-key identification method.

26. A network element of a telecommunication system, wherein said network element is configured to provide network access for at least one terminal device and, said network element is configured to check a first identifier of said terminal device, said network element is configured to receive a third party identifier from said terminal device, said network element is configured to establish a connection to a third party other than a called party on the basis of the received third party identifier in response to said terminal device not having the first identifier accepted by said network element, said network element is configured to offer telecommunication services for said terminal device in response to a confirmation from the third party, and said network element is configured to initiate a connection establishment to a network according to a number to be called.

27. A network element as claimed in claim 26, wherein the network element is a mobile services switching centre of a wireless telecommunication system.

* * * * *